United States Patent [19]

Onodera et al.

[11] 4,443,839

[45] Apr. 17, 1984

[54] SINGLE ENDED, SEPARATELY DRIVEN, RESONANT DC-DC CONVERTER

[75] Inventors: Toshihiro Onodera, Tokyo; Youichi Masuda, Yokohama, both of Japan

[73] Assignee: Tokyo Shibaura Denki Kabushiki Kaisha, Kawasaki, Japan

[21] Appl. No.: 329,438

[22] Filed: Dec. 10, 1981

[30] Foreign Application Priority Data

Dec. 23, 1980 [JP] Japan ............................... 55-182341
Dec. 26, 1980 [JP] Japan ............................... 55-185812
Dec. 26, 1980 [JP] Japan ............................... 55-185813

[51] Int. Cl.³ ............................................ H02M 3/335
[52] U.S. Cl. ..................................... 363/20; 363/131; 331/112
[58] Field of Search ..................... 363/20, 21, 131; 323/288; 331/112

[56] References Cited

U.S. PATENT DOCUMENTS

| | | | |
|---|---|---|---|
| 2,978,627 | 4/1961 | Joseph | 331/112 |
| 3,376,489 | 4/1968 | Crayton | 363/20 |
| 3,541,420 | 11/1970 | Rees . | |
| 3,828,239 | 8/1974 | Nagai et al. | 363/20 |
| 4,058,758 | 11/1977 | Peterson . | |

FOREIGN PATENT DOCUMENTS

| | | | |
|---|---|---|---|
| 755195 | of 0000 | Belgium . | |
| 1613318 | of 0000 | Fed. Rep. of Germany . | |
| 2298898 | of 0000 | France . | |
| 2306593 | of 0000 | France . | |
| 945654 | of 0000 | United Kingdom . | |
| 1058465 | 2/1967 | United Kingdom | 363/20 |

OTHER PUBLICATIONS

Patents Abstracts of Japan, vol. 5, No. 78(E-58) (750), May 22, 1981.
"A Frequency-Stabilized Free-Running DC-to-DC Converter Circuit Employing Pulse-Width Control Regulation", W. A. Peterson, Jun. 8, 1976, PESC 76 record.
Electronics, "Ringing Choke Simplifies d-c to d-c Conversion", pp. 90-92, Apr. 18, 1966.

*Primary Examiner*—William H. Beha, Jr.
*Attorney, Agent, or Firm*—Oblon, Fisher, Spivak, McClelland & Maier

[57] ABSTRACT

A single ended, separately driven, resonant DC-DC converter including a transformer, a capacitor connected in parallel with a primary winding of the transformer, a switching transistor connected between one end of the primary winding of the transformer and one end of a DC power source, and a blocking oscillating circuit for driving the switching transistor. The blocking oscillating circuit is directly driven by the DC power source and contains circuits for properly setting a pulse width and a pulse stop period of output pulses from the blocking oscillating circuit.

2 Claims, 39 Drawing Figures

FIG. 1
PRIOR ART

FIG. 2A COLLECTOR VOLTAGE OF TR

FIG. 2B VOLTAGE ACROSS CAPACITOR C

FIG. 2C COLLECTOR CURRENT OF TR

FIG. 2D BASE CURRENT OF TR

FIG. 2E OUTPUT OF TC

FIG. 3 VOLTAGE ACROSS C

SINGLE ENDED, SEPARATELY DRIVEN, RESONANT DC-DC CONVERTER

BACKGROUND OF THE INVENTION

The present invention relates to a DC-DC converter including a blocking oscillating circuit and a voltage resonance type switching circuit.

A DC-DC converter of the type in which a first DC voltage is converted into a voltage with a rectangular wave by means of a switching circuit, the rectangular wave voltage is smoothed through a transformer, and the smoothed voltage is supplied to a load, as a second DC voltage, has been known. This type of DC-DC converter, because of meritorious features of small size and light weight, has widely been used as DC power sources for terminal equipment of computers and general communication equipment. This is especially true for a small capacity DC-DC converter with an output of 200 W or less of the single end type in which a switching element for turning on and off a first DC voltage is inserted between one end of the transformer and a first DC voltage source, because of its low cost and simple construction. For further details of the single end type DC-DC converter, reference is made to IEEE Power Electronic Conference, 1977, pp 160, "A New Optimum Topology Switching DC-DC converter". A basic switching scheme in the DC-DC converter is categorized into a buck power stage system, a boost power stage system, a buck-boost power stage system, and a boost-buck power stage system. Common to those systems is a conversion of the DC power source voltage into a voltage having a rectangular wave. The common feature increases a switching loss of the switching element making up the switching circuit to necessitate a radiator plane for radiating heat. A self-exciting type circuit with omission of an oscillating circuit for driving the switching circuit, employed in the switching system, hinders the increase of the switching speed by a feedback action. A voltage resonance type switching system as a modification of the buck-boost power stage system as mentioned above, allows the improvement of a switching efficiency by shaping "L" the switching characteristic of the switching element. The "L shaping" of the switching characteristic means that in the graph in which a current of the switching element is plotted on an ordinate and a voltage between terminals of the switching element is plotted on an abcissa the switching element is operated to form the voltage-current characteristic of "L" Shape. This approach indeed succeeds in increasing the switching efficiency, but needs an external drive circuit and an auxiliary power source for driving the switching element, resulting in the complexity of the construction of a DC-DC converter. In this respect, there has been a demand for driving the switching element by the output of an oscillating circuit driven by the first DC voltage mentioned before. The attempt, however, has been unsuccessful in that the mere use of an oscillating circuit provides an unstable or abnormal oscillation output due to a counter action of the switching circuit.

SUMMARY OF THE INVENTION

Accordingly, an object of the present invention is to provide a DC-DC converter which ensures a stable DC-DC conversion, in which, in a DC-DC converter having a switching element inserted between a DC power source and an input terminal of a transformer, for example, a blocking oscillator with an output stabilizing means directly driven by the DC power source voltage is used as an oscillator for driving a switching circuit of the voltage resonance type.

According to the present invention, there is provided a DC-DC converter comprising: an ideal transformer with a leakage inductance and an exciting inductance in the primary winding; a capacitor connected in parallel with the exciting inductance of the ideal transformer; switching means of the voltage resonance type including a switching element connected between the primary winding of the ideal transformer and an input DC power source, the switching means periodically interrupting a voltage of the DC power source; a blocking oscillating circuit with output stabilizing means which directly receives a voltage of the input DC power source and controls the switching means by the oscillating output; and means for rectifying and smoothing the output from the secondary winding of the ideal transformer and for supplying the rectified and smoothed output to a load.

The stabilizing means of the blocking oscillating circuit including a means for individually change a pulse width and a pulse stop period of an output signal from the blocking oscillating circuit, a means for keeping the pulse width and the pulse stop period at fixed values, or a means for preventing a reaction or counter action from the switching circuit to the blocking oscillating circuit.

DETAILED DESCRIPTION OF THE PREFERRED EMBODIMENTS

Figure 4:
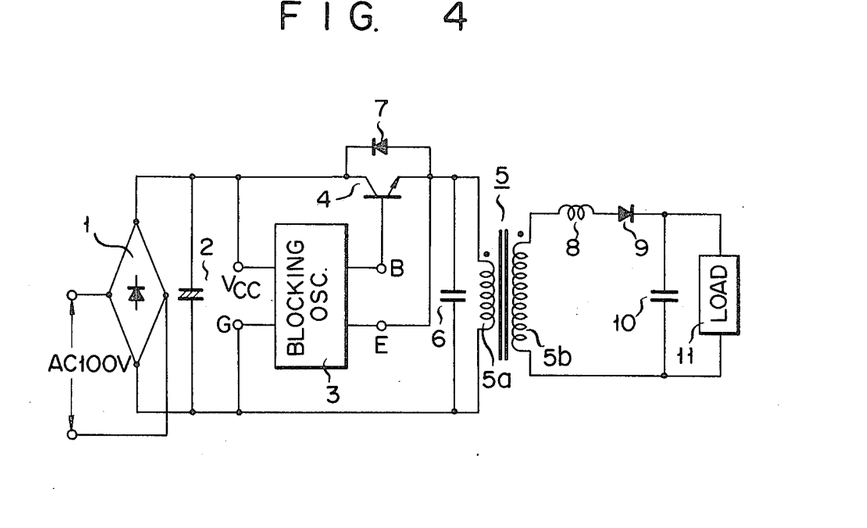
FIG. 4 is a circuit diagram showing an embodiment of a DC-DC converter according to the present invention.

FIG. 4 shows an embodiment of a DC-DC converter according to the present invention. An AC power source of 100 V, for example, is rectified by a full-wave rectifying circuit 1, and a rectified output is smoothed by a smoothing capacitor 2, thereby to obtain an input DC voltage Vcc. A blocking oscillating circuit 3 is supplied with the input DC voltage Vcc and a voltage G of a ground level as its inputs. A transformer 5 for power transmission includes a primary coil 5a and a secondary coil 5b with polarities indicated by black dots. The primary coil 5a is connected in parallel with a resonance capacitor 6. A collector-emitter path of a power transistor 4 is connected between the power source voltage Vcc and one end of the primary coil 5a. A damper diode 7 polarized as shown is connected in parallel to the collector-emitter path. An output terminal B of the blocking oscillating circuit 3 is coupled with the base of the transistor 4, and another output terminal E is connected to the emitter of the transistor 4. The power source voltage Vcc-G (referred often to as Vcc) is converted into a voltage with a rectangular wave by the transistor 4 controlled by the outputs B and E of the oscillating circuit 3, and the rectangular wave is taken out after being voltage-converted by the primary coil 5a and the secondary coil 5b magnetically coupled with each other. The secondary coil 5b is connected in series with a choke coil 8 and a rectifying diode 9, and the voltage-converted rectangular wave is supplied to a predetermined load 11 after being smoothed by the smoothing capacitor 10.

In the DC-DC converter shown in FIG. 4, an output characteristic of the blocking oscillating circuit 3 must be extremely stable. The blocking oscillating circuit used in the present invention has a novel output stabilizing means. The output stabilizing means includes a means which is either for keeping both an output pulse width and a pulse stop period constant or for freely setting the output pulse width and the pulse stop period. The blocking oscillating circuit 3 can be modified variously. For clearer understanding the differences of the arrangement, function and operation of those modifications from a prior blocking oscillating circuit, the prior blocking oscillating circuit will be described referring to FIGS. 1, 2A to 2E and 3.

Figure 1:
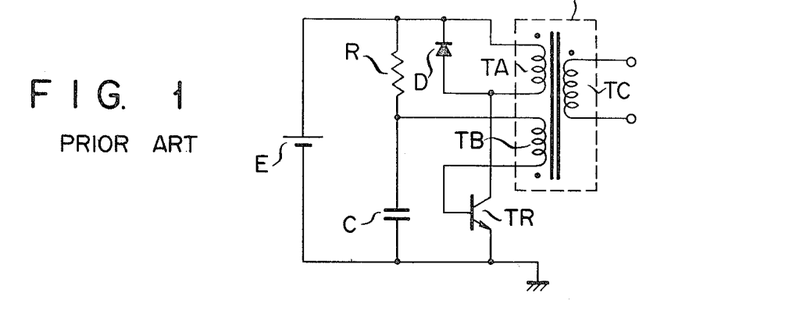
FIG. 1 is a circuit diagram of a prior blocking oscillating circuit.
Figure 2A:
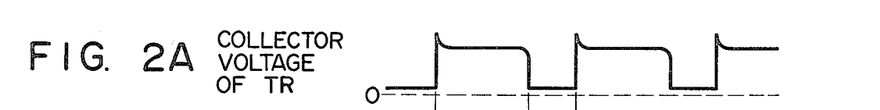
FIGS. 2A to 2E and 3 are waveforms useful in explaining an operation of the circuit shown in FIG. 1.
Figure 2B:
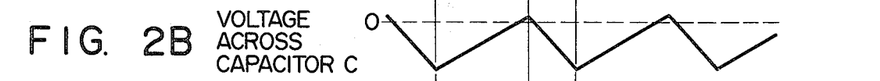
Figure 2C:
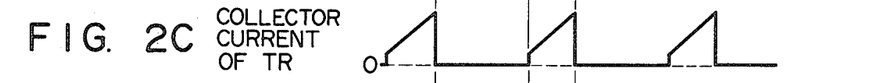
Figure 2D:
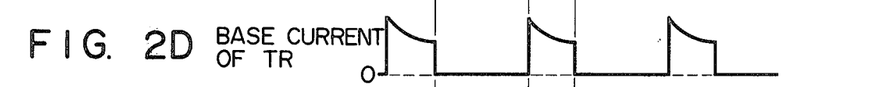
Figure 2E:
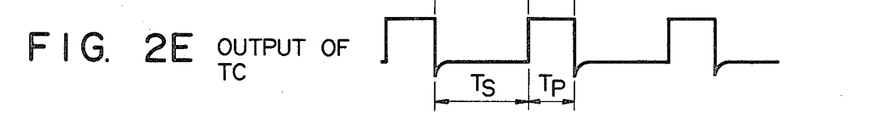
Figure 3:
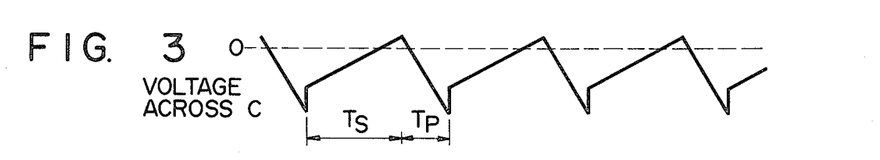

In FIG. 1, a series circuit of a resistor R and a capacitor C and another series circuit of a primary coil TA of a transformer T and a switching transistor TR are connected between terminals of a power source E. A base of the transistor TR is connected to a junction point of the resistor R and the capacitor C via a secondary coil TB. A diode D with polarities as shown is connected between the terminals of the primary coil TA. An oscillation output is taken out from the tertiary coil TC. FIG. 2 shows a waveform of a collector voltage of the transistor TR, FIG. 2B shows a waveform of a charge/discharge characteristic of the capacitor C, FIG. 2C illustrates a waveform of a collector current of the transistor TR, FIG. 2D shows a waveform of a base current of the transistor TR, and FIG. 2E illustrates a waveform of an output from the tertiary coil TC. FIG. 3 shows the detail of a charge/discharge characteristic of the capacitor C. During the output pulse stop period $T_S$, the capacitor C is charged negative and the transistor TR is in the cut-off condition. During this period $T_S$, the charge in the capacitor C is discharged to the power source E through the resistor R, and the potential across the capacitor C rises to become positive, a base current flows through the transistor TR, so that the transistor TR is turned ON. More particularly, because of the flow of the collector current, a positive feedback is active, and the base current increases, with the result that the transistor TR is rapidly saturated. During a period $T_P$ (a pulse period) that a voltage of the power source E is fully applied to the primary coil TA, the base current gradually decreases with a gradual increase of an exciting current for an inductance of the primary coil TA. At an instant that a value obtained by multiplying the base current by a current amplification factor of the transistor TR becomes equal to the collector current, the transistor TR is rapidly cut off. At the cut-off time, the exciting current residual in the primary coil TA is absorbed by the diode D. The cut-off condition is kept until the capacitor C charged during the OFF period of the transistor TR is discharged. That is, the pulse stop period $T_S$ is set up. In the blocking oscillating circuit shown in FIG. 1, an internal resistance of the transistor TR is very small at the time of its saturation. Then, it is deemed that the transformer T is shorted by the transistor TR. Therefore, the output impedance of the blocking oscillating circuit is low and therefore the oscillating circuit is suitable for a pulse power source. However, when the voltage of the power source E is high or the circuit is operated with a high frequency output, the rise and fall characteristics of the output pulse become poorer, and the stop period $T_S$ becomes shorter than a designed value. The reason for this follows. When transistor TR shifts from the ON state to the OFF state, the current flowing through the secondary winding TB is inverted. Nevertheless, the transistor TR is incompletely cut off. Therefore, the capacitor C is temporarily shorted through the transistor TR. As the result of the instantaneous shortcircuiting, the charge in the capacitor C is partially lost as shown in FIG. 3. Also, there is a case that the collector current and the base current vary with temperature and hence the oscillation frequency is not stabilized. Therefore, it is difficult to directly apply the prior blocking oscillation circuit shown in FIG. 1 to the DC-DC converter shown in FIG. 4 without modifying.

Figure 5:
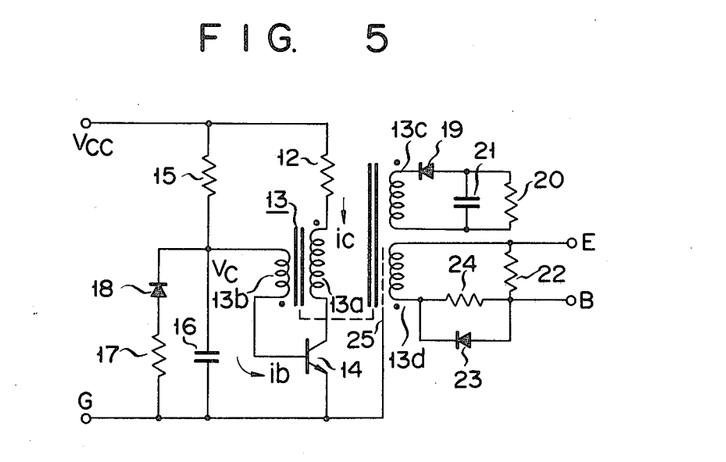
FIG. 5 shows a circuit diagram of the blocking oscillating circuit shown in FIG. 4.

An embodiment of the blocking oscillating circuit 3 used in a DC-DC converter according to the present invention is illustrated in FIG. 5. Since the blocking oscillating circuit 3 has a small output impedance, as well known, it is convenient in use when the switching element 4 is a bipolar transistor. In FIG. 5, a collector-emitter path of an npn switching drive transistor 14 is connected between the input terminals Vcc and G in series with a resistor 12 and a primary winding 13a of a drive transformer 13. A series circuit of a resistor 15 and a capacitor 16 is connected between the input terminals Vcc and G, as a time constant circuit to determine an off period of the transistor 14. The not grounded terminal of the capacitor 16 is connected to the base of the transistor 14 through a secondary winding 13b of the drive transformer 13. A base current is designated by $i_b$. The polarities of the primary winding 13a and the secondary winding 13b of the transformer 13 are set so as to be opposite to each other, as indicated by the black dots. In other words, the polarities are set so that when an excitation current of the primary winding 13a is generated backward, it is fed back to the base of the transistor 14. A series circuit of a resistor 17 and a diode 18 with the polarity as shown is connected in parallel between the terminals of the capacitor 16. The pulse width of the oscillating circuit 3 is adjusted by means of this series circuit to determine the discharge characteristic of the capacitor 16. Further, a resistor 20 and a capacitor 21 are connected in parallel with the series circuit of a tertiary winding 13c of the transformer 13 and a diode 19 with the polarity as shown, thereby to determine a pulse stop period of the output signal of the oscillator 3.

Further, a quartic winding 13d to lead out an output pulse of the oscillating circuit 3 is provided in the transformer 13. An output B of the quartic winding 13d is applied to the base of the transistor 4 and an output E thereof is also applied to an emitter of the transistor 4. A resistor 22 is connected between the outputs B and E. A parallel parallel circuit of a resistor 24 and a diode 23 with the polarity as shown is provided to prevent the backward current from one terminal of the quartic winding to the output terminal B is inserted between both the terminals. A shield plate 25 designated by a dotted line is set between the quartic winding 13d and the other windings to prevent a voltage induced by a voltage change, as a reaction to the switching operation of the transistor 4, from sneaking into the winding 13a, 13b and 13c except the quartic winding 13d. The potential of the electrostatic shield plate 25 is kept at one level G of the input DC voltage, thereby to prevent capacitive coupling of the quartic coil 13d with the remaining windings 13a, 13b and 13c. Accordingly, the induced voltage arising from a voltage change of the switching circuit including the transistor 4 is prevented from reaching the blocking oscillating circuit 3.

An operation condition of the DC-DC converter shown in FIG. 4 is set up as given below. It is assumed that the switching circuit including the transistor 4 executes a switching operation of the voltage resonance type with a sub-class E mode. More specifically, a magnetic energy stored in an inductance of the primary winding 5a of the transformer 5 during the conduction of transistor 4 is charged into a capacitor 6 for the resonance, during the off-period of the transistor 4. As a result, an output voltage of the transistor 4 changes like a sine wave. A voltage between the collector and the emitter of the transistor 4 is set at zero through the action of the damper diode 7 after the half period of the sine wave. The transistor 4 is driven so as to conduct again during the period that the collector-emitter voltage is zero. Specifically, a conduction period and a nonconduction period of the transistor 4 are set by an inductance of the primary winding 5a of the transformer 5, a choke coil 8 including a leakage inductance and a capacitance of the resonance capacitor 6, for supplying the electric power to the load 11 at the input voltage Vcc. Even if a feedback winding (not shown) is provided in the transformer 5, and the output from the feedback winding is fed back to the base of the transistor 4, it is impossible to satisfy the operating condition. On the other hand, the DC-DC converter according to the present invention can execute the switching operation of the voltage resonance type by driving the transistor 4.

The conduction period of the transistor 4 is substantially determined by the inductance of the primary winding 13a of the blocking oscillating circuit 3, the current amplification factor $\beta$ of the transistor 14, and the resistance of the resistor 17 for setting the pulse width. The off-period of the transistor 4, i.e. a nonconduction period, is substantially determined by the time constant given by the resistance of the resistor 15 and the capacitance of the capacitor 16, and the resistance of the resistor 20 for setting the off-period of the transistor 4. With this circuit arrangement, only the pulse width of the output signal from the blocking oscillating circuit 3 may be changed by properly selecting a set value of the resistor 17 for setting the pulse width, without any change of the basic operating condition in the oscillating circuit 3. In other words, this does not affect the determination of the off-period of the transistor 4. Additionally, only the off-period of the transistor 14 can independently be set by the set value of the resistor 20 for setting the off-period of the transistor 14, without any effect upon the pulse width setting condition of the output pulses of the transistor 14. With the arrangement to independently set the pulse width of the output pulses from the oscillating circuit 3 and the pulse stop period, the operating condition of the apparatus shown in FIG. 4 can be satisfied by a simple circuit construction.

Figure 6A:
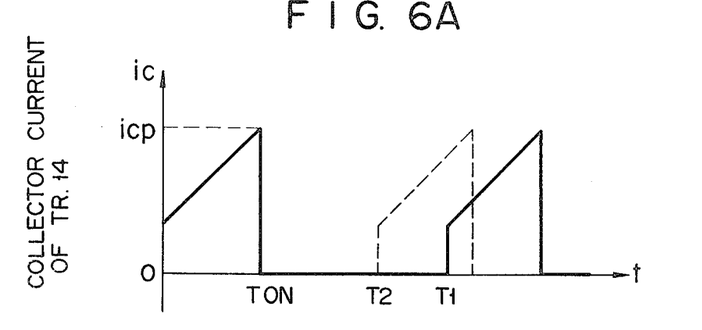
FIGS. 6A to 6C are waveforms useful in explaining the operation of the blocking oscillating circuit shown in FIG. 5.
Figure 6B:
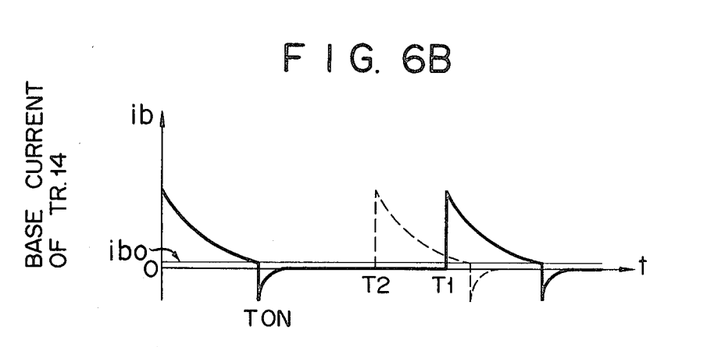
Figure 6C:
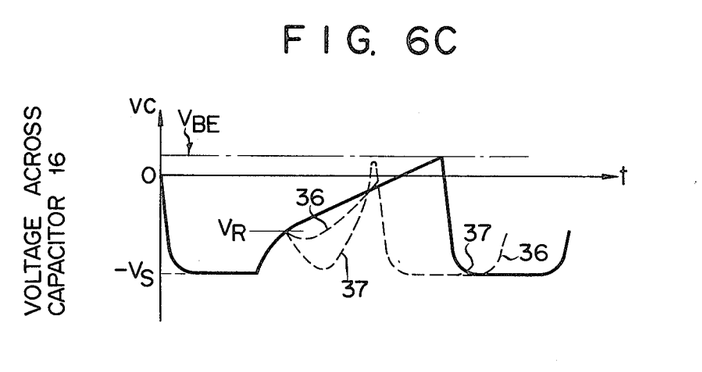
Figure 7A:
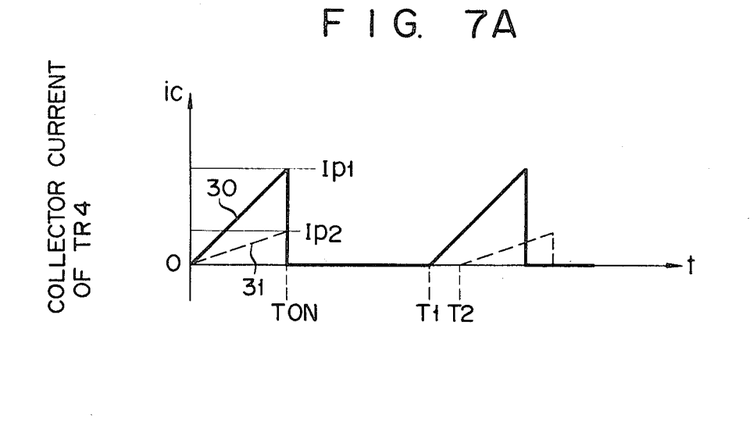
FIGS. 7A to 7C show waveforms useful in explaining the operation of the DC-DC converter shown in FIG. 4.
Figure 7B:
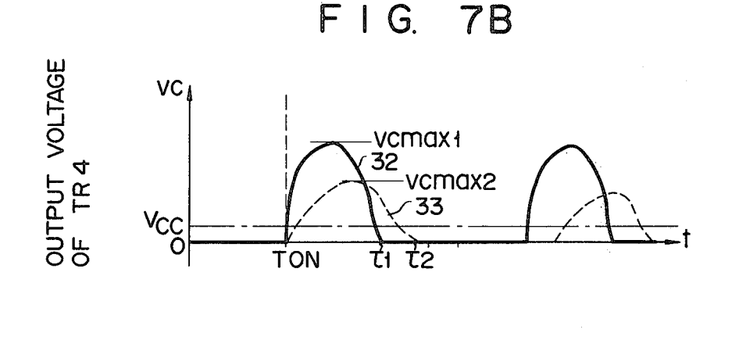
Figure 7C:
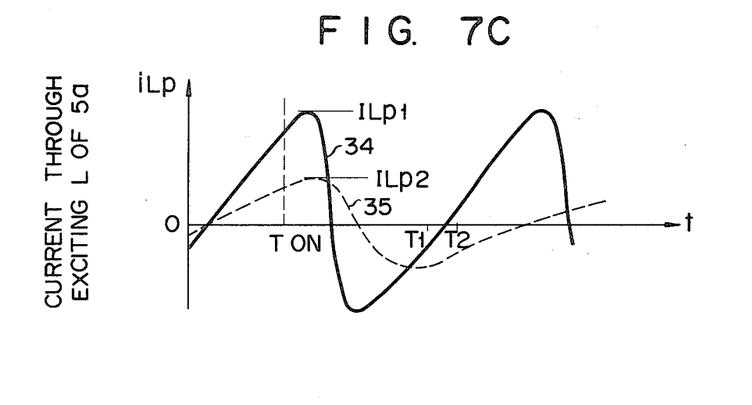

How the output voltage waveform of the transistor 4 in the DC-DC converter shown in FIGS. 4 and 5 affects the oscillating condition of the blocking oscillating circuit 3, will be discussed referring to waveforms shown in FIGS. 6A to 6C, and FIGS. 7A to 7C. Waveforms in the respective portions of the blocking oscillator 3 are illustrated in FIGS. 6A to 6C. Waveforms in the respective portions of the switching circuit containing the transistor 4 are shown in FIGS. 7A to 7C. In FIG. 6A, the time length 0-$T_{ON}$ indicates an on-period of the transistor 14; the time length $T_{ON}$-T1 an off-period of the transistor 14; $i_c$ a collector current of the transistor 14; and $i_{cp}$ a peak value of the collector current $i_c$. In FIG. 6B, $i_b$ designates a base current of the transistor 14, and $i_{bo}$ indicates a base current for determining a current amplification factor $\beta = i_{cp}/i_{bo}$ of the transistor 14. In FIG. 6C vc designates a terminal voltage across the capacitor 16, Vs=$n_b \times$Vcc ($n_b$ designates a turn ratio of the primary winding 13a of the transformer 13 to the secondary winding 13b), $V_R$=nn·Vconst (n indicates a turn ratio of the tertiary winding 13c of the transformer 13 to the secondary winding 13b, and Vconst stands for a terminal voltage across the resistor 20), $V_{BE}$ designates a minimum base voltage required for the conduction of the transistor 14. In FIGS. 6A to 6C, the waveform indicated by the broken line is produced due to the voltage induced in the capacitor 16 during the off-period of the transistor 4. In FIG. 7A, $i_c$ stands for a collector current of the transistor 4, 30 a waveform of the current $i_c$ when the load 11 has a rate value, Ip1 a peak value of the waveform 30, 31 a waveform of the current $i_c$ when the load 11 is light, Ip2 a peak value of the waveform 31. In FIG. 7B, vc designates an output voltage of the transistor 4, 32 a waveform of the voltage vc at the rated load, vcmax1 its peak value of the waveform 32, 33 a waveform of the voltage vc at a light load, vcmax2 its peak value of the waveform 33, Vcc an input voltage level of the oscillating circuit 3. In FIG. 7C, iLP represents a waveform of an excitation current flowing through the primary winding 5a of the transformer 5 at the rated load, 34 a waveform of the current iLP at the rated load, $I_{LP1}$ the peak value of the waveform 34, 35 a waveform of the current and iLP at a light load, $I_{LP2}$ the peak value of the waveform 35.

When the switching circuit containing the transistor 4 operates in a stationary mode, the transistor 4 turns off for a period of $T_{ON}$-T1 (FIG. 7A). The waveform of the output voltage of the transistor 4 during the off-period is substantially sinusoidal, as indicated by the waveform 32. The sinusoidal voltage 32 is induced into the capacitor 16 by way of a capacitance between the quartic winding 13d and the secondary winding 13b of the transformer 13 in the blocking oscillating circuit 3. As a result of the voltage induction, the polarity of the amplitude of the voltage across the capacitor 16 changes, as seen from curves 36 and 37 designated by a broken line in FIG. 6C. A problem encountered here is that the voltage across the capacitor 16 has a spike (see a curve 37) at t=T2 (FIG. 6C) and the level of the spike exceeds the base voltage level $V_{BE}$ necessary for the transistor conduction between the base and emitter of the transistor 14. When the spike exceeds the level $V_{BE}$, the transistor 14 conducts at time t=T2 (FIG. 6A) before t=T1 by the positive feedback action of the oscillating circuit 3. As a result, the oscillating period of the oscillating circuit 3 becomes short. The conduction of the transistor 14 at time t=T2 has a serious effect on the operation of the DC-DC converter. Under this condition, during the off-period of the transistor 4 ($T_{ON}$T1 1 in FIG. 7A) during this time duration that a voltage is applied to the collector of the transistor 4, the transistor 4 starts the next ON operation. The result is that an excessive spike current flows into the transistor 4, resulting in an abrupt increase of the switching loss of the transistor 4. It is noted that the DC-DC converter of the present invention uses an electrostatic shielding plate 25 to reduce the capacitance among the windings of the transformer 13 and therefore the capacitive coupling among the windings is prevented. Accordingly, no voltage is induced in the capacitor 16 when the transistor 4 is turned on and off. Then, the voltage vc across the transistor 14 never exceeds the voltage $V_{BE}$ during the period $T_{ON}$-T1, as indicated by the curve 37 in FIG. 6C. Thus, the oscillating circuit 3 operates stably. In addition to the stable operation, the pulse width of the output signal from the oscillating circuit 3 and the pulse stop period between the adjacent pulses can independently be set, as mentioned above. Therefore, the oscillating circuit 3 may be oscillated, while the input DC voltage Vcc is applied to the oscillating circuit 3, and the switching circuit including the transistor 4 can be driven without any auxiliary power source.

In the DC-DC converter shown in FIGS. 4 and 5, even if the load 11 changes, the oscillating period of the oscillating circuit 3 automatically changes to allow the switching waveform of the voltage resonance type by the transistor 4 to be invariable. In the voltage resonance type switching circuit, when the load 11 gradually changes from the rated load to a light load, the switching period of the transistor 4 gradually becomes long if the conduction duration of the switching transistor 4 is fixed. For example, when the waveform 30 of the collector current $i_c$ of the transistor 4 at the rated load is changed to the wave form 31 at the light load, as shown in FIG. 7A, the nonconduction period of the transistor 4 changes from the period $T_{ON}$-T1 to $T_{ON}$-T2. The half period of the output voltage vc (FIG. 7B) in the off-period of the transistor 4 also changes $T_{ON}$-τ1 to $T_{ON}$-τ2; that is τ2>τ1. When the load 11 becomes lighter and the half period of the wave form 33 becomes long, $T_{ON}$-τ2 exceeds $T_{ON}$-T1 (FIG. 7A). In this case, when the operation period of the transistor 4 is left equal to the period at the rated load, a large spike current flows into the transistor 4 at time t=T1, thereby possibly to destroy the transistor 4. For example, in the blocking oscillating circuit 3 according to the present invention, the oscillating period changes in accordance with a variation of the load of the quartic winding 13d. The change of the load has a direction that when the load of the quartic winding 13d is light, the oscillation stop period ($T_{ON}$-T1 in FIG. 7A) becomes long and hence the drive period of the transistor 4 becomes long. Therefore, according to the DC-DC converter shown in FIG. 4, the transistor 4 can be stably driven, irrespective of the variation of the load 11.

With respect to the control of the output from the blocking oscillating circuit 3, the resistor 17 for pulse width setting and the pulse stop period setting resistor 20 in FIG. 5 may be substituted by a variable impedance element, respectively. Further, in FIG. 4, the voltage transformer 5, as a means for transmitting electric power to the load 11, may also be replaced by a choke coil. The power transmission means including a voltage transformer or a choke coil may be expressed by an ideal transformer including a leakage inductance and an exciting inductance in the primary winding. Further, the connecting positions of the transistor 4 and the transformer 5 may be replaced with each other.

Figure 8A:
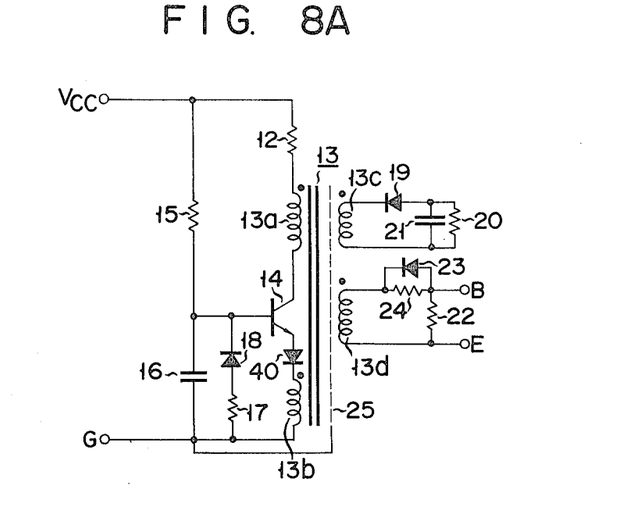
FIGS. 8, 8B and 9 show circuit diagram of first, second and third modifications of the blocking oscillation circuit shown in FIG. 4.
Figure 8B:
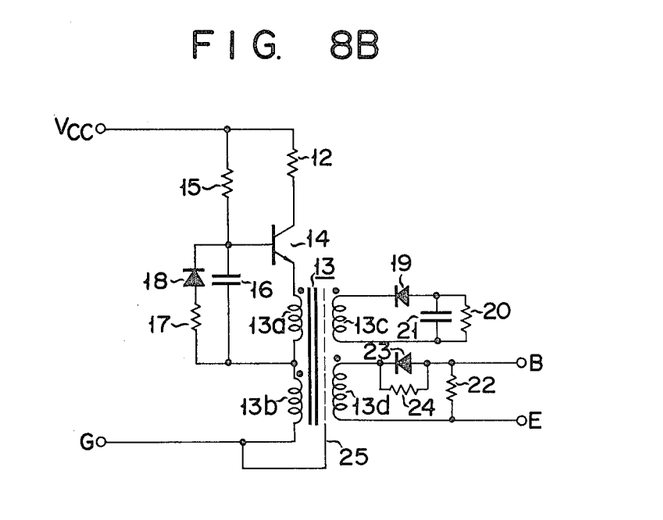

FIGS. 8A and 8B shows an arrangement of a blocking oscillating circuit which can be used in place of the blocking oscillating circuit shown in FIG. 5. The oscillating circuit shown in FIG. 8A employs the common base connection for the transistor 14, while the transistor connection in FIG. 5 is of the common emitter type. The transistor connection in the oscillating circuit of FIG. 8B is of the common collector type. In those figures, like reference numerals are used to designate like portions in FIG. 5. Therefore, no further explanation of those portions will be given. In FIG. 8A, the emitter of the transistor 14 is grounded through a series circuit of the diode 40 and the secondary winding 13b of the transformer 13. The base of the transistor 14 is directly connected to the connection point between the resistor 15 and the capacitor 16. In FIG. 8B, the collector of the transistor 14 is connected to a resistor 12, and the emitter thereof is grounded through the series circuit of the primary winding 13a and the secondary winding 13b of the transformer 13. The base of the transistor 14 is connected to a connection point between the resistor 15 and the capacitor 16. The junction point between the capacitor 16 and the resistor 17 is connected to the connection point between the primary winding 13a and secondary winding 13b of the transformer 13. The oscillating circuit shown in FIGS. 8A or 8B serves as a DC—DC converter, like the oscillating circuit shown in FIG. 5. Therefore, the explanation of the operations of those circuits will be omitted.

Figure 9:
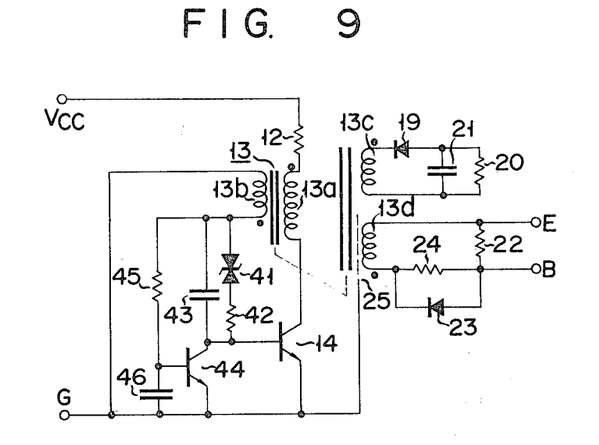

Another arrangement shown in FIG. 9 may be used in place of the blocking oscillating circuit 3 shown in FIG. 4. In FIG. 9, like reference numerals are used to designate like portions in FIG. 5, and the explanation of those portions will be omitted. A bidirectional Zener diode 41 is connected between the base of the transistor 14 and the secondary winding 13b of the transformer 13, through a resistor 42. A capacitor 43 is connected between the base of the transistor 14 and the secondary winding 13b. A transistor 44 has a collector-emitter path connected between the base and emitter of the transistor 14. A resistor 45 is connected between the junction point of the secondary winding 13b with the capacitor 43 and the base of the transistor 44. Another capacitor 46 is connected between the base and emitter of the transistor 44. The oscillating circuit in the present embodiment operates in substantially the same manner as the blocking oscillating circuit shown in FIG. 5.

Figure 10:
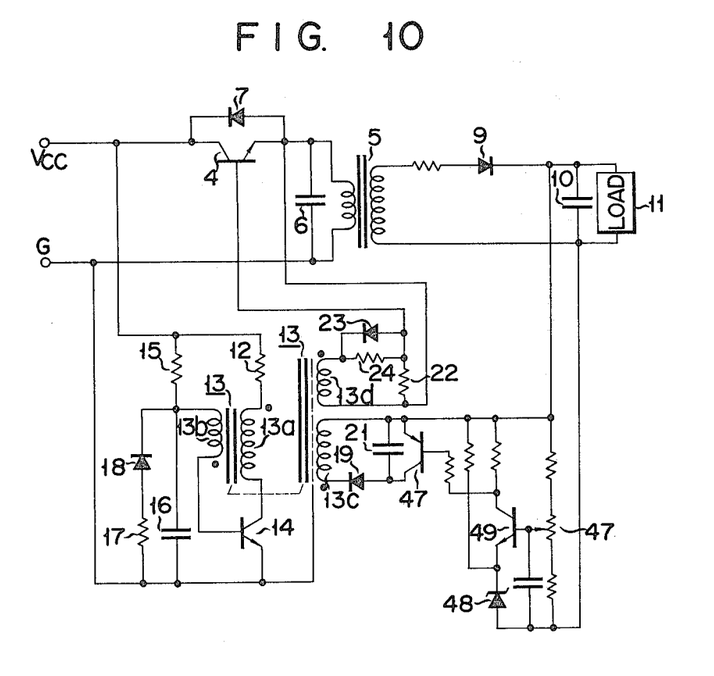
FIG. 10 is a circuit diagram showing another embodiment of a DC-DC converter according to the present invention.

FIG. 10 shows an arrangement of another embodiment of a DC-DC converter according to the present invention. In the figure, like numerals are used to designate like portions in FIGS. 4 and 5, and no further explanation of those portions will be given. In the present embodiment, an emitter-collector path of the transistor 47 as a variable resistive element is used in place of the resistor 20 for setting the pulse stop period of the output pulse from the oscillating circuit 3. The resistance of the transistor 47 is controlled by the collector voltage of a transistor 49 which responds to a difference between the terminal voltage across the load 10 and a reference voltage from the reference voltage setting element 48. Through the resistance control, the output voltage of the load 11 is controlled in a feedback manner. The present embodiment can limit a regulation of the voltage of the load 11 to 2% or less.

In each of the blocking oscillating circuits shown in FIGS. 5, 8A, 8B, 9 and 10, the pulse width and the pulse stop period of the output from the oscillating circuit can be individually set and the shield plate 25 is used. The blocking oscillating circuits shown in FIGS. 5, 8A, 8B, 9 and 10 may be replaced by any of blocking oscillating circuit 3 shown in FIGS. 11A, 13A, 13B and 14. The oscillating circuit 3 of each of those figures has a means to independently adjust the pulse width and the pulse stop period of the output signal thereof, but has no shield plate 25. The prior blocking oscillating circuit frequently operates unstably or stops its oscillation when the input DC voltage (Vcc in FIG. 4) falls within a range of 100 to 400 V. On the other hand, in the blocking oscillating circuit according to the present invention, such disadvantages of the prior art can be removed by adjusting the output pulse width and the pulse stop period. Accordingly, the blocking oscillating circuit is well adaptable for the DC-DC converter.

Figure 11A:
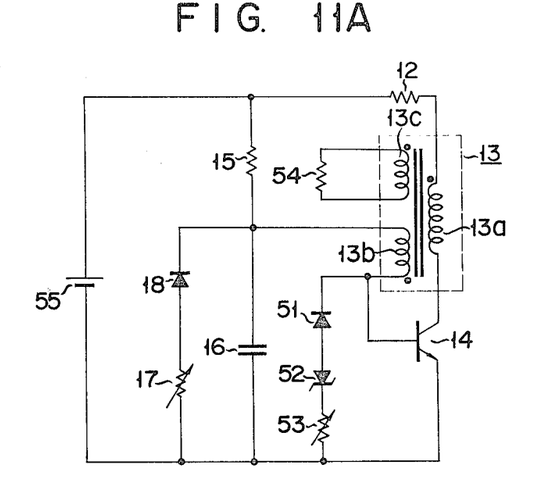
FIG. 11A is a circuit diagram showing a fourth modification of the blocking oscillator shown in FIG. 4.

In FIG. 11A, like reference numerals designate like portions in FIG. 5. In the figure, reference numeral 55 designates a DC power source of which the output voltage Vcc is set within 100 to 400 V. As in the case of FIG. 5, the npn transistor 14 is connected across the power source through the resistor 12 and the primary winding 13a of the transformer 13. The capacitor 16 is connected across the power source 55 through the resistor 15. The base of the transistor 14 is connected to the junction point between the capacitor 16 and the resistor 15 through the secondary winding 13b of the transformer 13. A series circuit of a diode 51 polarized as shown, a Zener diode 52 and a variable resistor 53 is connected between the base and emitter of the transistor 14. The series circuit of the diode 18 and the variable resistor 17 is connected across the capacitor 16. In the present embodiment, the tertiary winding 13c, which is for supplying an output signal of the blocking oscillating circuit to the terminals B and E in FIG. 4, is connected to a load resistor 54. When Vcc is 100 to 400 V, the resistance of the resistor 12 is set at 100 ohms or more. The resistance of the resistor 17 is so adjusted to be smaller than the impedance of the capacitor 16 at the frequency of the output signal from the oscillating circuit. The value of the load resistor 54 is selected to have the quotient when the resistance of the resistor 12 is divided by the square of the turn ratio of the number of turns of the tertiary winding 13c to the primary winding 13a.

Figure 11B:
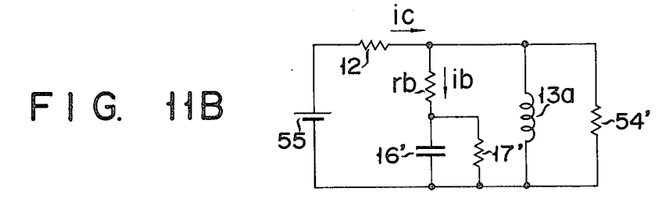
FIGS. 11B to 11D are equivalent circuit diagrams useful in explaining the operation of the circuit shown in FIG. 11A.
Figure 11C:
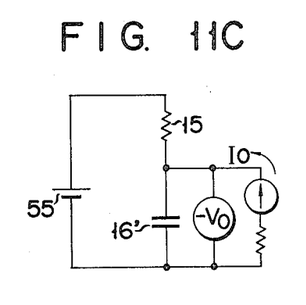
Figure 11D:
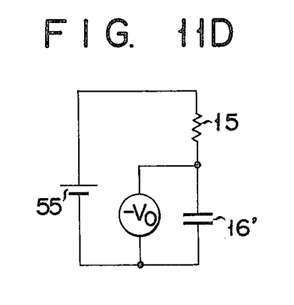
Figure 12A:
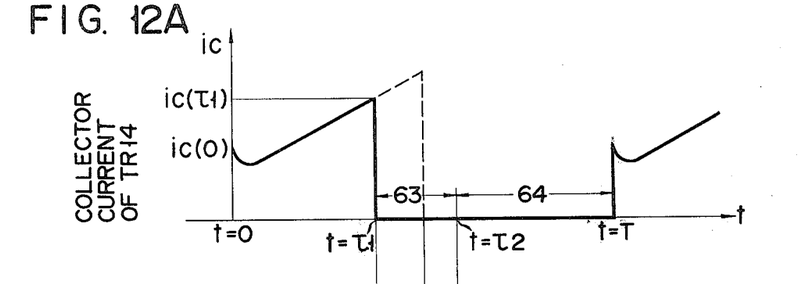
FIGS. 12A to 12D are waveform diagrams helpful in explaining the operation of the circuit in FIG. 11A.
Figure 12B:
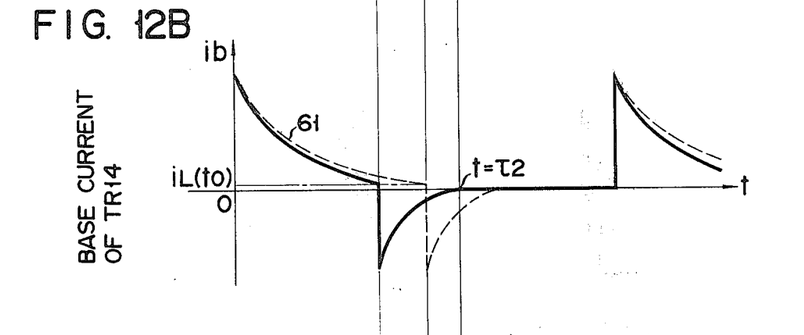
Figure 12C:
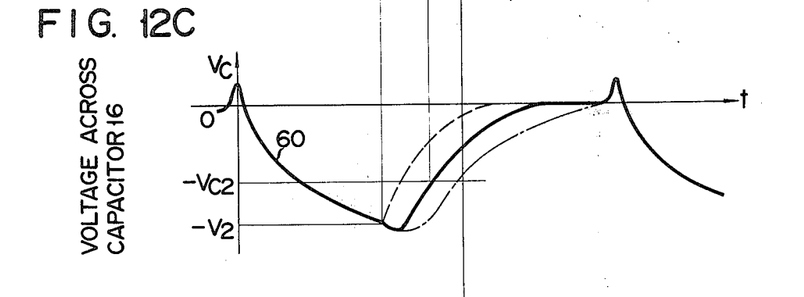
Figure 12D:
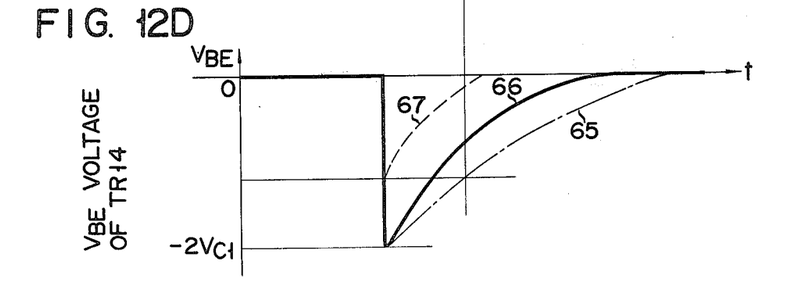

In the blocking oscillating circuit shown in FIG. 11A, the output pulse stop period is adjusted to a proper period by gradually damping the excitation current of the transformer 13 by a variable resistor 53. The pulse width is adjusted to a proper width by changing the current charged in the capacitor 16 by a variable resistor 17. The operation of the circuit shown in FIG. 11A will be described referring to equivalent circuits shown in FIGS. 11B to 11D and waveforms shown in FIGS. 12A to 12D. In FIG. 12A, $i_c$ designates the collector current of the transistor 14 and $i_{c(\tau 1)}$ is $i_c$ when $t=\tau 1$, and $i_{c(0)}$ is $i_c$ when $t=0$. In FIG. 12B, $i_b$ is the base current of the transistor 14, and iL(t0) is the excitation current flowing into the primary winding 13a when $t=0$. In FIG. 12C, Vc is the voltage across the capacitor 16, Vc2=(terminal voltage across the load 54)/n' (n' is the turn ratio of the secondary winding 13b to the tertiary winding 13c), and V2=Vcc/n (n is the turn ratio of the primary winding 13a to the secondary winding 13b). In FIG. 12D, $V_{BE}$ is the voltage between the base and emitter of the transistor 14. Vc1 is the charging voltage across the capacitor 16 when $t=\tau 1$.

During period $0 \leq t \leq \tau 1$ (FIG. 12A), the transistor 14 saturates. During the saturated period, the circuit in FIG. 11A may be expressed by an equivalent circuit shown in FIG. 11B. In FIG. 11B, the resistor rb represents the resistance between the base and emitter of the transistor 14. The resistor 17' represents the value converted by a turn ratio of the primary winding 13a of the secondary winding 13b. The resistance 54' represents the value of the load resistor 54 converted by the turn ratio of the primary winding 13a to the tertiary winding 13c. The capacitance of the capacitor 16' is a converted value of the capacitance of the capacitor 16 converted by the turn ratio of the primary winding 13a to the secondary winding 13b. The collector current $i_c$ of the transistor 14 flowing into the resistor 12 when the transistor 14 is saturated is the sum of the currents flowing into the resistor 54', the excitation inductance of the primary winding 13a, and the resistor rb. The variation of the collector current against time is plotted in FIG. 12A. As shown, at time $t=0$ when the transistor 14 conducts, a current $i_{c(0)}$ defined as the quotient when Ein (=Vcc) id divided by the parallel resistance of resistors 54' and (rb+17') flows and then the current flowing into the inductance of the primary winding 13a gradually increases. Accordingly, the terminal voltage across the primary winding 13a decreases. As a result, the current $i_b$ decreases with time, as shown in FIG. 12B. When $t=\tau 1$, the ratio of $i_{c(\tau 1)}$ to $i_{b(\tau 1)}$ is equal to the current amplification factor $\beta$. When $t=\tau 1$, the transistor 14 is abruptly turned off.

Part of the current $i_b$ flowing through the base resistor rb of the transistor 14 charges the capacitor 16. The polarity of the charging is to maintain the off condition of the transistor 14, as indicated by the waveform 60 shown in FIG. 12C. When the value of the resistor 17' is smaller than the initial one, the base current $i_b$ of the transistor 14 is as indicated by a broken line 61 in FIG. 12B. In other words, the temperature impedance of the capacitor 16 increases as the amount of the charging charge increases with time. When the temperature impedance exceeds the resistance of the resistor 17', the current flowing into the resistor 17' increases with respect to the current flowing into the capacitor 16. Thus, the decreasing rate of the base current $i_b$ is gentle. As the result, a time until the ratio $i_{c(\tau 1)}/i_{b(\tau 1)}$ reaches the current amplification factor $\beta$ of the transistor 14 is elongated. This implies that the turn-off timing of the transistor 14 is delayed and the output pulse width of the blocking oscillating circuit is large. In the blocking oscillating circuit applied for the DC-DC converter of the present invention, the output pulse width may be adjusted to a proper value by changing a value of the resistor 17.

In FIG. 11A, the operation of the oscillating circuit during the period ($\tau 1 \leq t \leq T$ in FIG. 12A) that the transistor 14 is turned off may be analyzed in the following manner. The off-period may be divided into two segmental periods; a segmental period 63 ($\tau 1$ to $\tau 2$) and a segmental period 64 ($\tau 2$ to T). The blocking oscillating circuit during the periods 63 and 64 are expressed by equivalent circuits shown in FIGS. 11C and 11D respectively. During the period 63, the back electromotive voltage induced in the secondary winding 13b is added to the charging voltage Vc1 which has been charged in the capacitor 16 at time $t=\tau 1$, thereby to inversely bias the base-emitter of the transistor 14. In FIG. 11C, the initial charging voltage of the capacitor 16 is expressed by $-Vo(=-Vc1)$ and the initial current of the secondary winding 13b is indicated by Io. During the period 64, electric energy stored in the capacitor 16 is discharged through the resistor 15 and the primary winding 13a. As a result, the base-emitter of the transistor 14 is slightly forward-biased (FIG. 12C). As a result of the forward-biasing, the transistor 14 is again positively fed back and conductive again. FIG. 12D illustrates the change of the voltage $V_{BE}$ between the base and emitter of the transistor 14 during the periods 63 and 64. When the value of the resistor 53 is sufficiently larger than that of the load resistor 54, the initial current Io in the transformer 13 is consumed by substantially only the resistor 54. As the result, a change of the voltage between the base and emitter of the transistor during the period 64 is very gentle, as is evident from the waveform 65 indicated by a one dot chain line. As the value of the resistor 53 approaches to the value of resistor 54, the initial current Io shown in FIG. 11C is consumed by the resistors 53 and 54. Accordingly, the change of the base-emitter voltage of the transistor 14 is illustrated by the waveform 66 indicated by a solid line in FIG. 12D. If a fly-wheel diode (not shown) is connected across the primary winding 13a, and the initial current Io shown in FIG. 11C is abruptly consumed, the base-emitter voltage $V_{BE}$ abruptly decreases like the waveform 67 indicated by a broken line in FIG. 12D to zero without passing through the period 64. In this case, the off-period of the transistor 14 is determined only by the time constant of a series circuit formed of the resistor 15 and the capacitor 16. For example, the off-time of the output signal from the oscillating circuit may be controlled by adjusting the consumption of the initial current Io with the connection of a series circuit of the fly-wheel diode 76 and variable resistor 78 between both ends of the primary winding 13a, as will be described later with reference to FIG. 14.

Figure 13A:
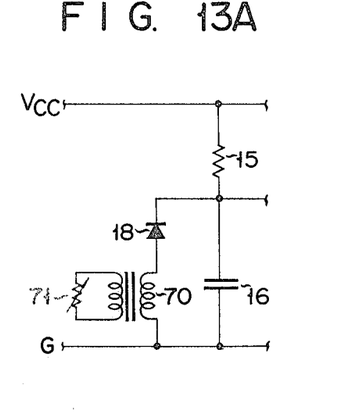
FIGS. 13A and 13B are circuit diagrams showing modifications of FIG. 11A.
Figure 13B:
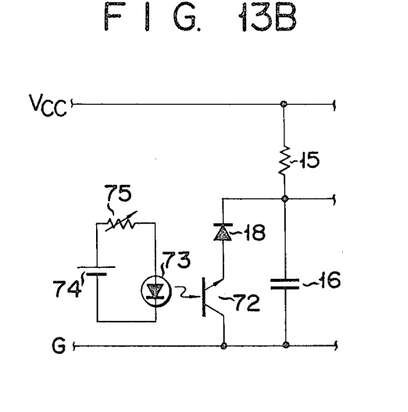

The pulse width adjusting means 17 and 18 shown in FIG. 11A may be modified as shown in FIGS. 13A and 13B. In FIG. 13A, the series circuit of the diode 18 polarized as shown and the transformer 70 is connected across the capacitor 16 and a variable resistor 71 is connected to the secondary winding of the transformer in series. In FIG. 13B, the series circuit of the photoresistor 72 and the diode 18 is connected across the capacitor 16 and a photoresistor 72 is controlled responsive to light emitted from the photodiode 73. A power source 74, a variable resistor 75 and a photodiode 73 are connected in series.

Figure 14:
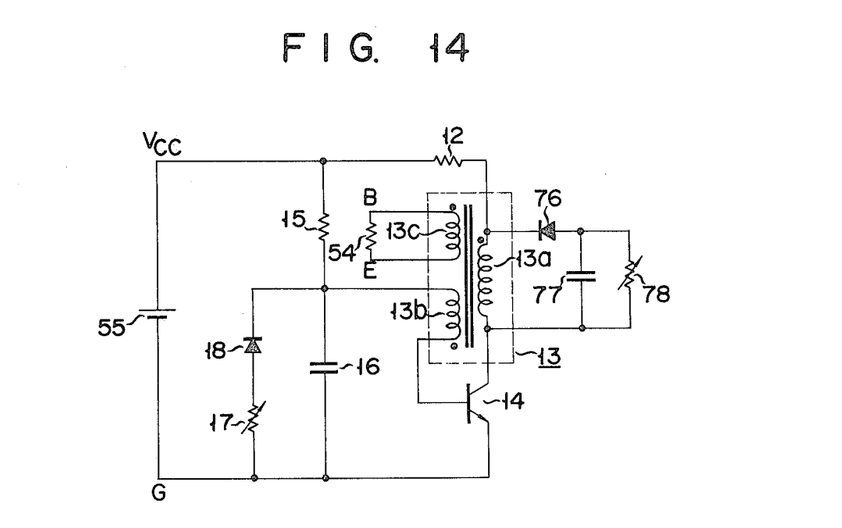
FIG. 14 shows a diagram of another blocking oscillating circuit usable as the blocking oscillating circuit shown in FIG. 4.

In the blocking oscillating circuit shown in FIG. 14, a series circuit of a fly-wheel diode 76 and a variable resistor 78 is connected across the primary winding 13a of the transformer 13. A smoothing capacitor 77 is connected across the resistor 78 in parallel. The period of output pulses from the oscillator may be controlled by adjusting the resistance of the variable resistor 78. The capacitor 77 also serves to limit the peak value of the transient voltage applied to the transistor 14.

An oscillating circuit with a means capable of stabilizing an oscillating frequency even if it can not individually set or adjust the pulse width and the pulse stop period of an output signal from the blocking oscillating circuit, is applicable for the DC-DC converter shown in FIG. 4. Such an oscillating circuit is illustrated in FIGS. 15 to 23, which will be described hereinafter.

Figure 15:
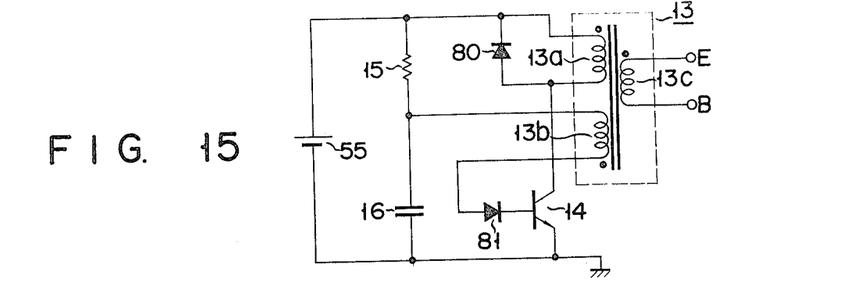
FIG. 15 shows a diagram of still another blocking oscillating circuit which is usable as the blocking oscillating circuit shown in FIG. 4.
Figure 16:
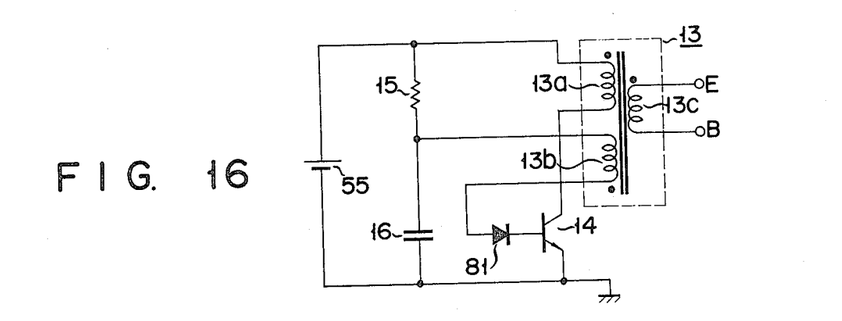
FIGS. 16 to 23 are circuit diagrams showing modifications of the blocking oscillating circuit shown in FIG. 15.

A different point of the blocking oscillating circuit shown in FIG. 15 from that shown in FIG. 1 is that a diode 81 polarized as shown is inserted between the secondary winding 13b (TB) of the transformer 13 (T) and the transistor 14 (TR). In FIG. 15, the base current supplied to the transistor 14 (TR), when the charge of the capacitor 16 (C) is discharged into the power source 55 (E) during the pulse stop period TS (FIG. 2E), flows into the transistor 14 through the diode 81 in a forward direction. At this point, the circuit of FIG. 15 is the same as that in FIG. 1. In the process of the transistor 14 changing from the on-state to the off-state, however, the capacitor 16 is not shorted through the transistor 14, since even if the current flowing through the secondary winding 13b is reversed, the reversed current is blocked by the diode 81. Even when the oscillating frequency is high and the rise and fall times of the transistor 14 are problematic, the discharge from the capacitor 16 which is performed through the emitter-base path of the transistor 14 is blocked by the diode 81. Therefore, the oscillating operation is stable. Further, the breakdown between the base and emitter of the transistor 14 is prevented by the diode 81. In an experiment conducted by the inventors of the present patent application, a 2SC2238 (Toshiba standard) was used for the transistor 14, and a 470 pF capacitor was used for the capacitor 81. When the diode 81 was not inserted, a voltage of about $-10$ V across capacitor 16 increased to about $-1$ V when the transistor 14 was cut off. As a result, the stop period $T_S$ (FIG. 2E) was about the half of the design value. When an IS1585 (Toshiba standard) was used for the diode 81, the charged voltage across the capacitor 16 remained unchanged at the cutoff time of the transistor 14, and the stop period $T_S$ of design value was obtained.

Figure 17:
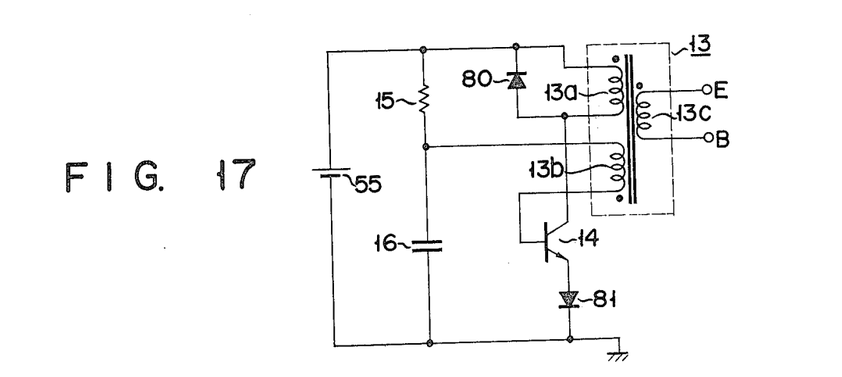
Figure 18:
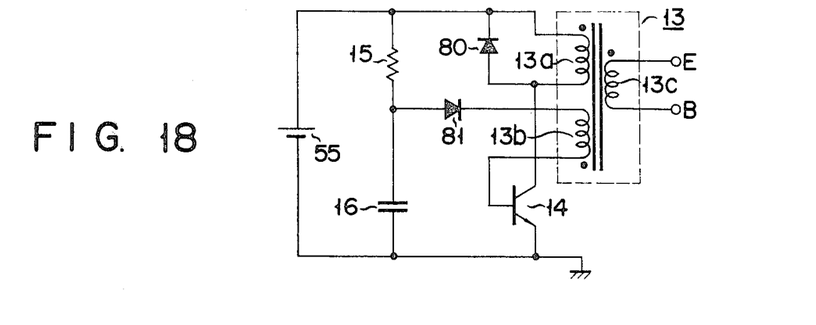
Figure 19:
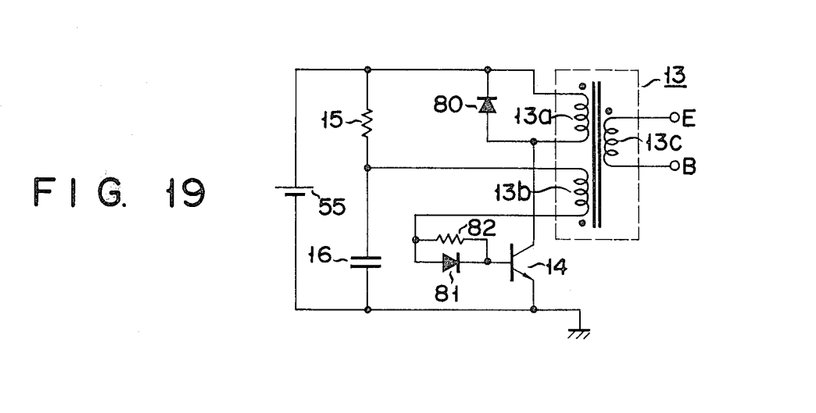
Figure 20:
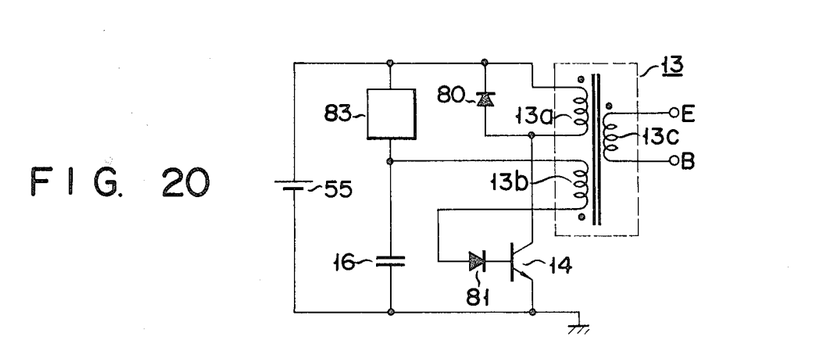
Figure 21:
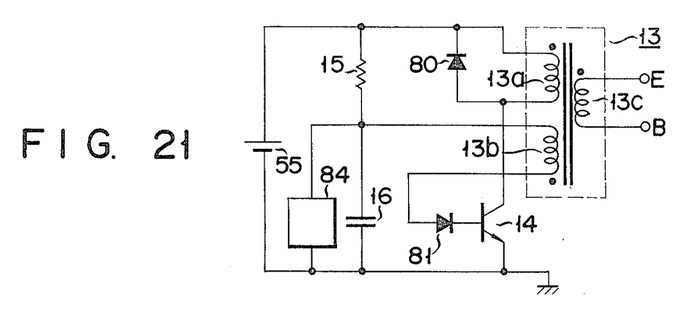
Figure 22:
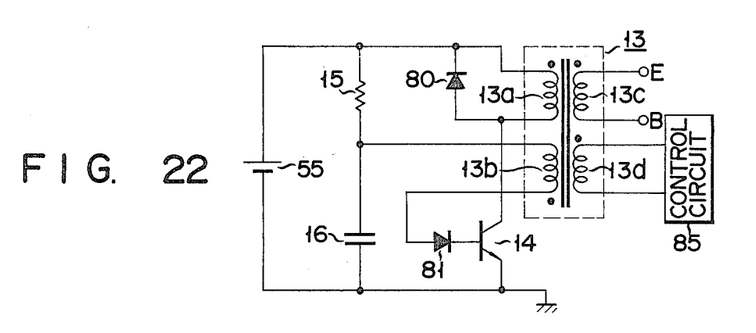
Figure 23:
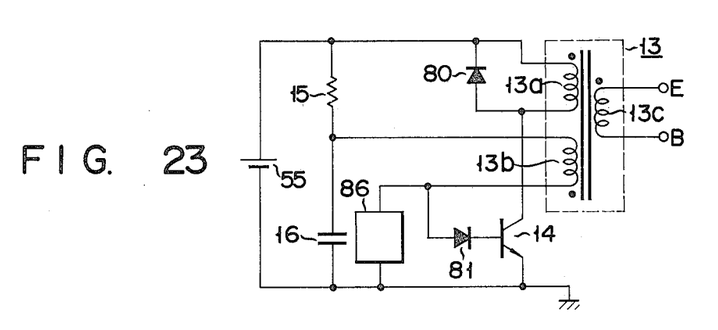

The circuits shown in FIGS. 16 to 23 are modifications of the circuit shown in FIG. 15. In the circuit shown in FIG. 16, the diode 80 for absorbing the excitation current in FIG. 15 is omitted. Since a diode 81 is provided, however, the oscillating output is stabilized. In FIG. 17, a diode 81 is inserted between the capacitor 16 and the emitter of the transistor 14. This circuit connection can prevent the capacitor 16 from discharging through the emitter-base path of the transistor 14 at the cutoff time. Therefore, the oscillating output can be stabilized. In FIG. 18, a diode 81 is inserted between a connection point between the resistor 15 and the capacitor 16, and the secondary winding 13b. The circuit of FIG. 18 can also attain the same effect of the circuit of FIG. 15. In the circuit shown in FIG. 19, a resistor 82 is connected in parallel with the diode 81 shown in FIG. 15 to control forward and backward impedances of the diode 81. This circuit can also stabilize the output of the oscillating circuit. In the circuit shown in FIG. 20, a variable impedance 83 is used for the resistor 15 in FIG. 15 to change the circuit time constant and to change the oscillating frequency. In the circuit shown in FIG. 21, a variable impedance circuit 84 is connected in parallel with the capacitor 16 to change the oscillating condition. In the circuit of FIG. 22, a quartic winding 13*d* is additionally provided in the circuit shown in FIG. 15 and the oscillating condition is controlled by adjusting the impedance of the quartic winding by the control circuit 85. The circuit shown in FIG. 23 has a variable impedance circuit 86 for changing the oscillating condition connected between the anode of the diode 81 and the emitter of the transistor 14.

What we claim is:

1. A DC-DC converter comprising:
   an ideal transformer with a leakage inductance and an exciting inductance in the primary side;
   a capacitor connected in parallel with said exciting inductance of said ideal transformer;
   switching means of the voltage resonance type including a switching element connected between said primary side of said ideal transformer and an input DC power source, said switching means periodically interrupting a voltage of said DC power source;
   a blocking oscillating circuit with output stabilizing means which directly receives a voltage of said input DC power source and controls said switching means by the oscillating output; and
   means for rectifying and smoothing the output from the secondary side of said ideal transformer and for supplying the rectified and smoothed output to a load;
   wherein said blocking oscillating circuit comprises,
   a switching transistor,
   a transformer including a primary winding connected in series to said switching transistor and excited by the voltage of said input DC power supply source, a first secondary winding for applying a feedback signal to the base electrode of said switching transistor, a second secondary winding for applying a control signal for intermittently interrupting said switching means, and a third secondary winding for setting a pulse stop period of the pulse to be obtained at the output end of said switching element of said switching means, and
   electrostatic shielding means for electrostatically shielding said second secondary winding from the remaining winding of said transformer.

2. A DC-DC converter according to claim 1, wherein said switching element is a bipolar transistor.

* * * * *